United States Patent Office 3,445,758
Patented May 20, 1969

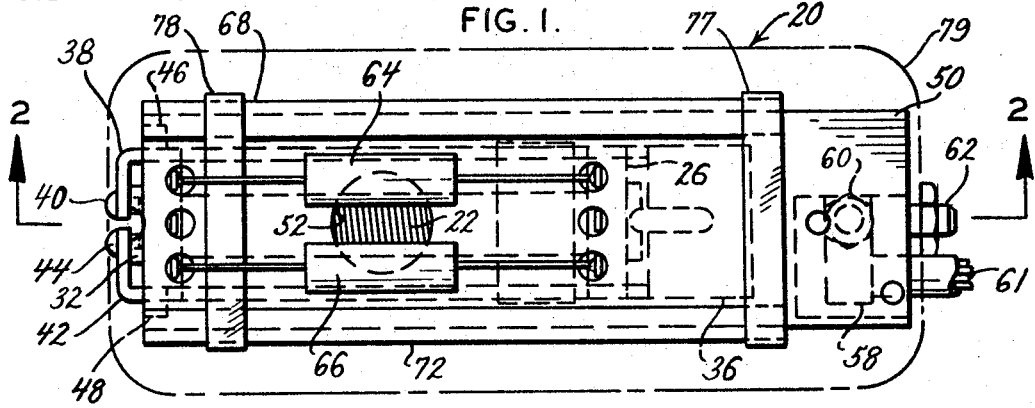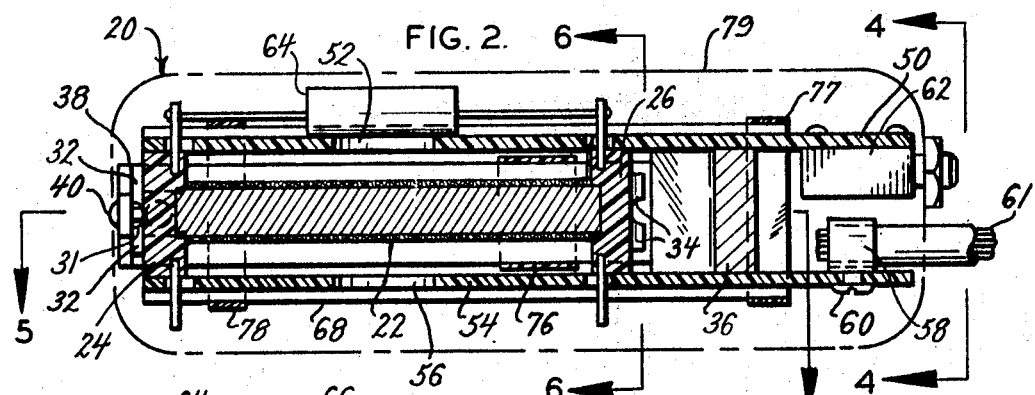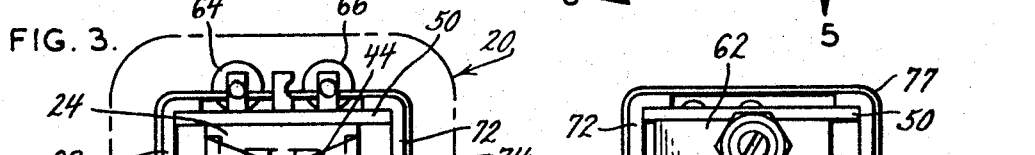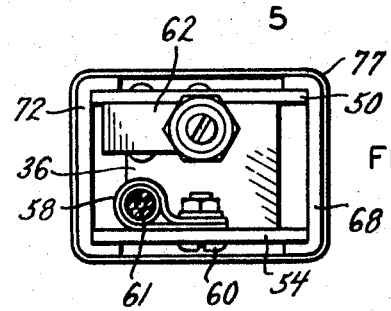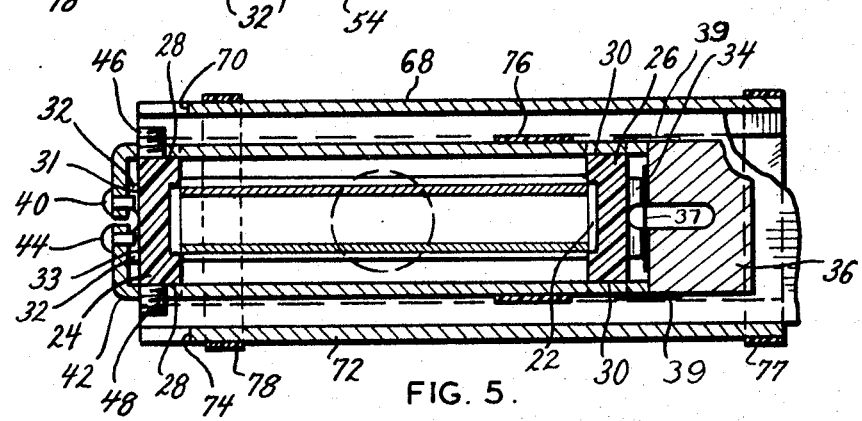

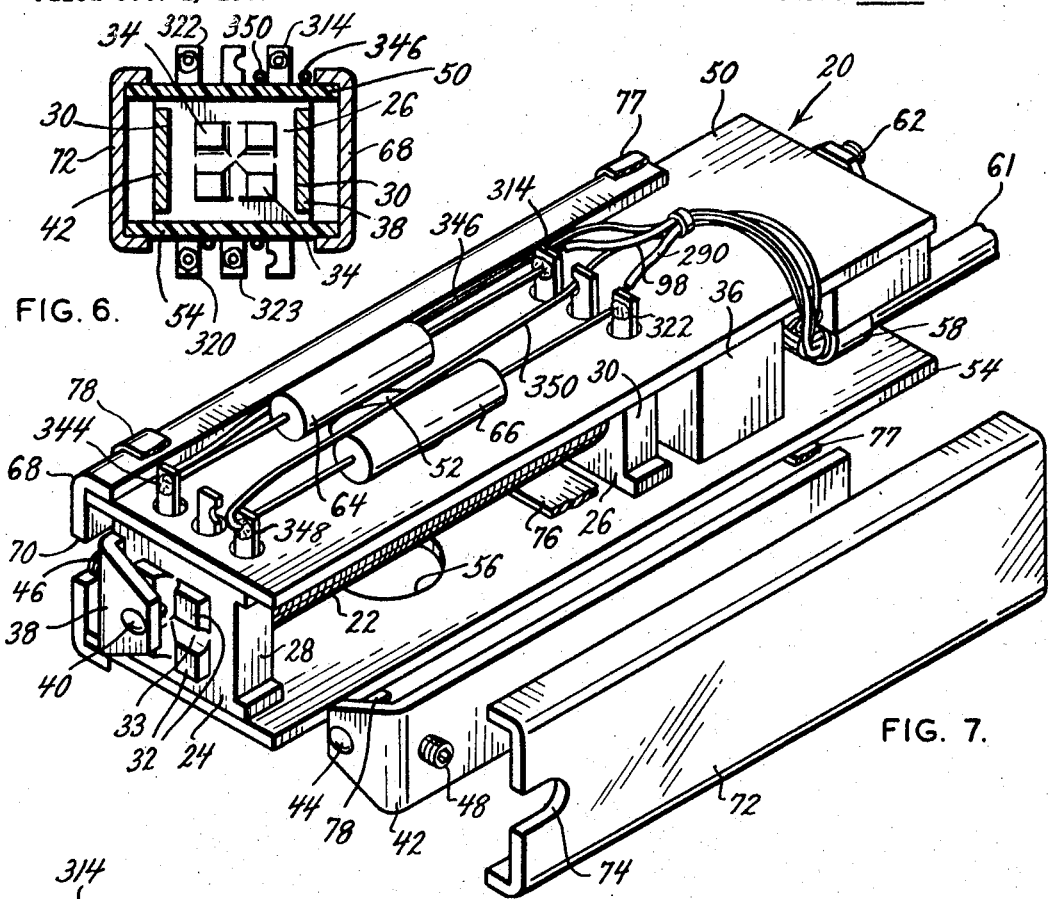
FIG. 6.
FIG. 7.
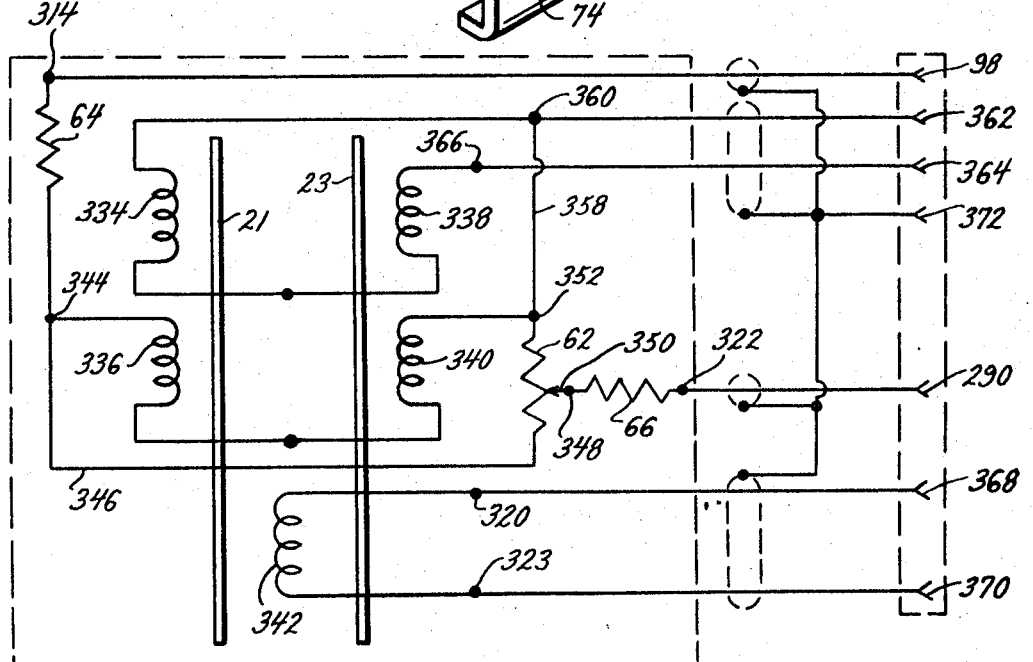
FIG. 8.

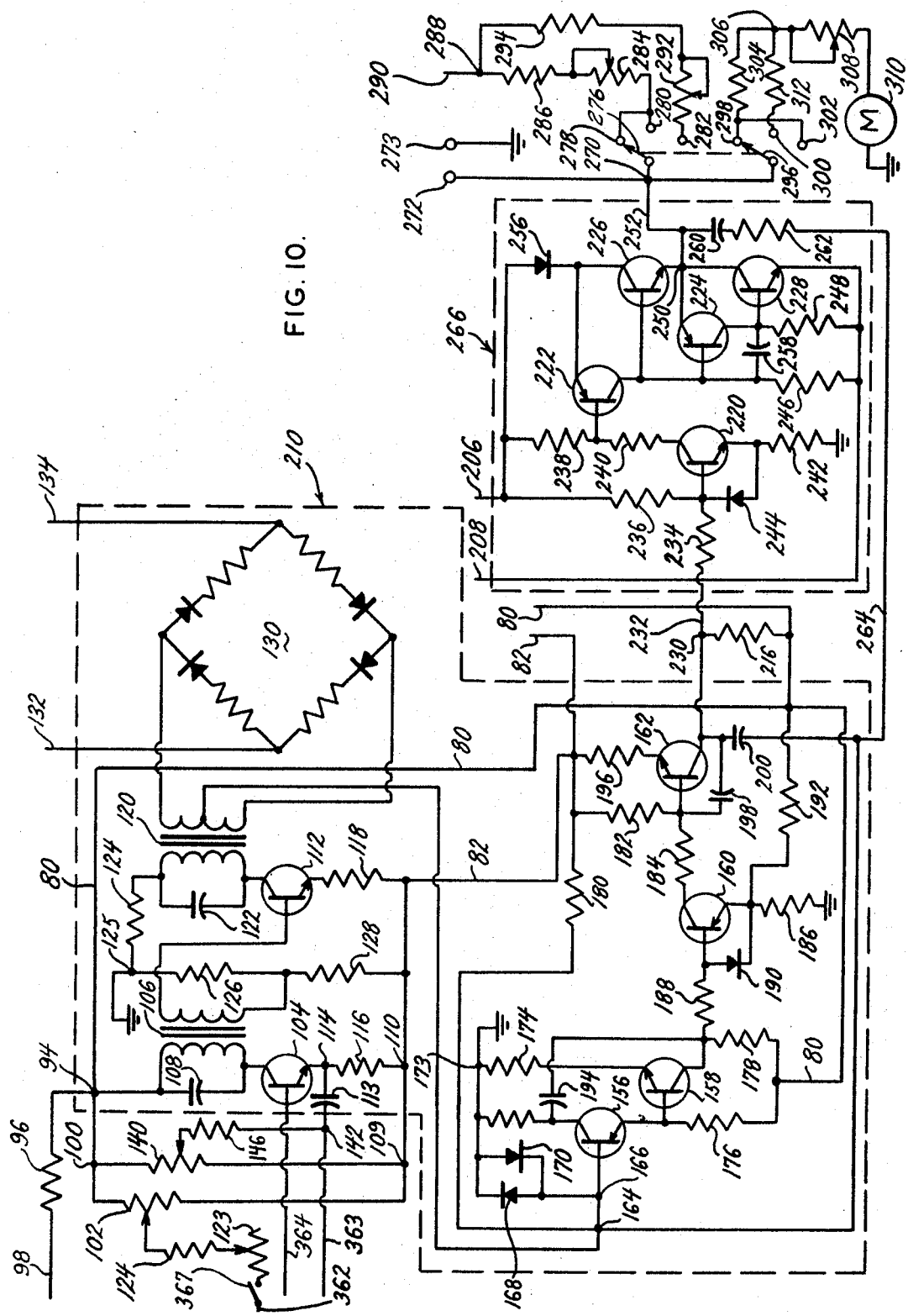

3,445,758
PERMEABILITY-SENSING CONTROL SYSTEM THAT UTILIZES A PROBE WHICH HAS A MAGNET, A MAGNETOMETER, AND A GAP-CONTAINING PATH OF MAGNETIC MATERIAL SHUNTING AND CLOSE TO THAT MAGNETOMETER
Harold J. Barmeier, Jr., Sappington, and Norman Wolff, Olivette, Mo., assignors to Sperry Rand Corporation, New York, N.Y., a corporation of Delaware
Filed Oct. 1, 1965, Ser. No. 492,147
Int. Cl. G01r 33/02
U.S. Cl. 324—34                    18 Claims

ABSTRACT OF THE DISCLOSURE

A permeability-sensing control system has a probe which includes a magnet, a magnetometer with energizing and sensing windings, and a path of magnetic material which is wholly separate from and in addition to the magnetometer. The magnetometer and the path of magnetic material are within the magnetic field developed by the magnet, are in substantial shunting relation with each other, have substantial portions of the lengths thereof coextensive with each other, and are sufficiently close to each other so a change in the reluctance of the path of magnetic material effects a change in the density of the magnet-induced flux lines in the magnetometer. The path of magnetic material has an air gap therein, and the positioning of that air gap in engagement with materials of different permeability will vary the reluctance of the path of magnetic material; and a circuit will respond to resulting changes in the density of the magnet-induced flux lines in the magnetometer to indicate a permeability value.

---

Figure 9:
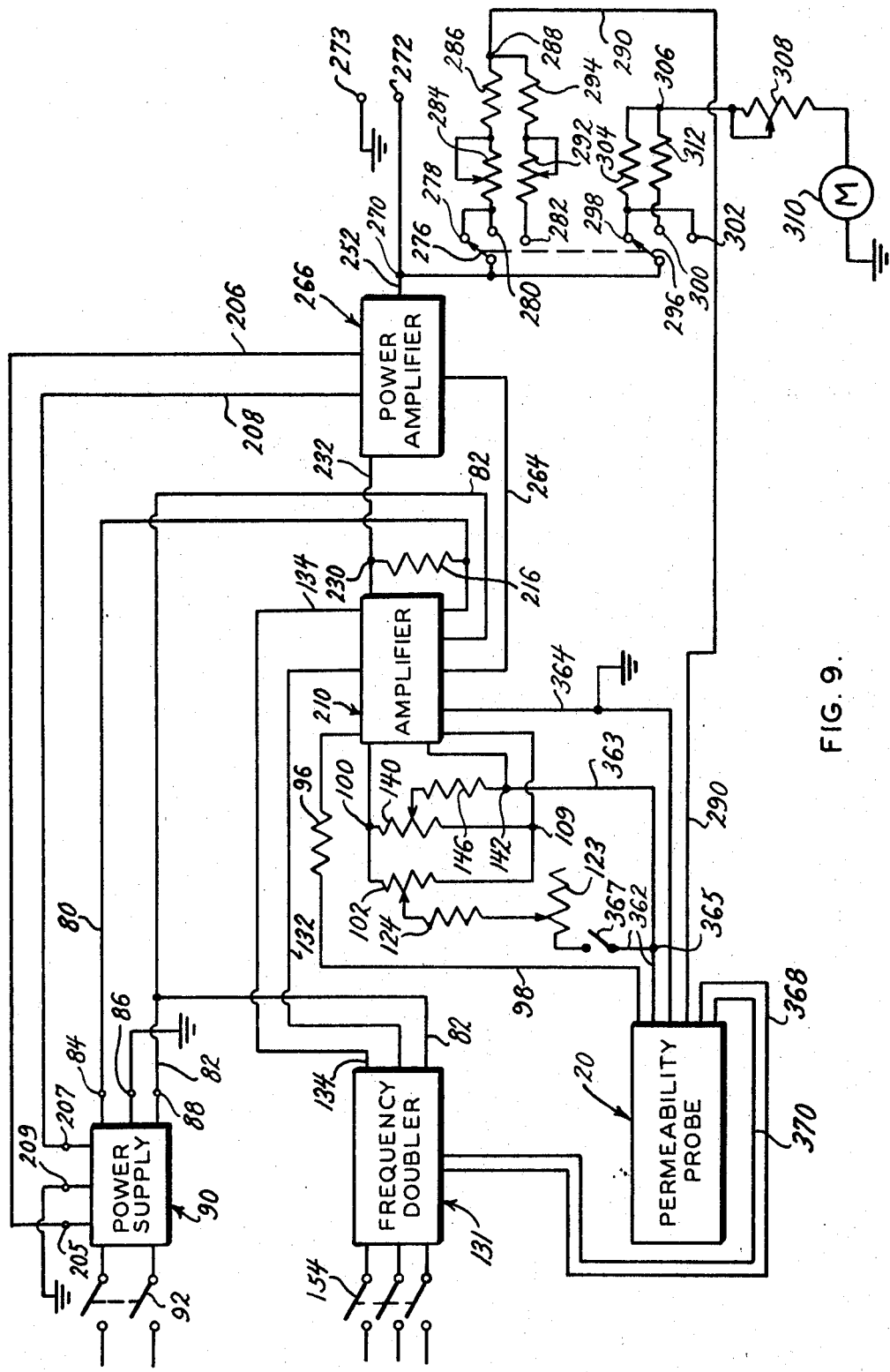

This invention relates to improvements in control systems. More particularly, this invention relates to improvements in permeability-sensing control systems.

It is, therefore, an object of the present invention to provide an improved permeability-sensing control system.

It is frequently important to ascertain the permeability of materials and objects; and, in recognition of that fact, several permeameters have been proposed. Some of those permeameters were intended for use in laboratories and were not adapted for use in the field, other of those permeameters could not sense the permeability of small objects, and still other of those permeameters could sense only objects of given sizes and shapes. As a result, prior permeameters have not been satisfactory; and hence it would be desirable to provide a control system which could sense the permeability of materials and objects in the field, which could sense the permeability of small objects, and which could sense the permeability of materials and objects of many different sizes and shapes. The present invention provides such a control system; and it is, therefore, an object of the present invention to provide a control system which can sense the permeability of materials and objects in the field, which can sense the permeability of small objects, and which can sense the permeability of materials and objects of many different sizes and shapes.

The permeability-sensing control system of the present invention has a permeability probe which is connected to it by a flexible electrical cable; and that flexible electrical cable makes it possible for the permeability probe to engage and sense many materials and objects that are stationary or are of such size and shape that they could not be engaged and sensed by a prior permeameter. As a result, the permeability-sensing control system provided by the present invention can readily sense the permeability of materials and objects which could not be sensed by a prior permeameter. It is, therefore, an object of the present invention to provide a permeability-sensing control system which has a permeability probe connected to it by a flexible electrical cable.

The permeability probe of the permeability-sensing control system provided by the present invention has a magnetic circuit with an air gap therein. In using that control system, the permeability probe is disposed adjacent the material or object of unknown permeability so that material or object will bridge the air gap of that magnetic circuit. That material or object will reduce the reluctance of that air gap; and the control system will respond to the increased flow of magnetic flux lines in the magnetic circuit of the permeability probe to indicate the permeability of that material or object. It is, therefore, an object of the present invention to provide a permeability probe, for a permeability-sensing control system, with an air gap which can have the reluctance thereof reduced by a material or object against which that permeability probe is pressed.

Other and further objects and advantages of the present invention should become apparent from an examination of the drawing and accompanying description.

In the drawing and accompanying description, a preferred embodiment of the present invention is shown and described but it is to be understood that the drawing and accompanying description are for the purpose of illustration only and do not limit the invention and that the invention will be defined by the appended claims.

In the drawing,

FIG. 1 is a plan view of one preferred form of permeability probe that is made in accordance with the principles and teachings of the invention before that permeability probe is encapsulated within a mass of insulating material, FIG. 2 is a sectional view through the permeability probe of FIG. 1, and it is taken along the plane indicated by the line 2—2 in FIG. 1, FIG. 3 is an elevational view of the left-hand end of the permeability probe of FIG. 1 before that permeability probe is encapsulated, FIG. 4 is a sectional view through the permeability probe of FIG. 1, and it is taken along the plane indicated by the line 4—4 in FIG. 2, FIG. 5 is another sectional view through the permeability probe of FIG. 1, and it is taken along the plane indicated by the line 5—5 in FIG. 2, FIG. 6 is a further sectional view through the permeability probe of FIG. 1, and it is taken along the plane indicated by the line 6—6 in FIG. 2, FIG. 7 is a partially exploded perspective view, on a larger scale, of the permeability probe of FIG. 1, FIG. 8 is a wiring diagram of the windings and connections in the permeability probe of FIG. 1, FIG. 9 is a schematic diagram of a permeability-sensing control system which includes the permeability probe of FIG. 1, and FIG. 10 is a detailed showing of the amplifier and power amplifier of the permeability sensing control system shown in FIG. 9.

*Components of permeability-sensing control system*

Referring to the drawing in detail, the numeral 20 generally denotes one preferred embodiment of permeability probe that is made in accordance with the principles and teachings of the present invention. That permeability probe includes a coil form 22 which has magnetic cores 21 and 23 therein. The magnetic cores 21 and 23 are closely adjacent each other, and they are parallel to each other. A nonmagnetic support 24 is provided at the left-hand end of the coil form 22, and a nonmagnetic support 26 is provided at the other end of that coil form, as that coil form is viewed in FIG. 1. While the supports 24 and 26 could be made of different materials, a nonmetallic, readily moldable plastic material is preferred. Generally rectangular, shallow notches 28 are provided in the narrow sides of the support 24; and similar notches 30 are provided in the narrow sides of the support 26. The notches 28 and 30 in the supports 24 and 26 are in register with each other. Four bosses 32 are provided on the outer face of the support 24; and the two left-hand bosses 32 are spaced apart to define a horizontally extending recess 31, while the two right-hand bosses 32 are spaced apart to define a horizontally extending recess 33. Similar bosses 34 are provided on the outer face of the support 26; but those bosses do not perform a significant function and are provided solely because it is economic to use the same mold to form both of the supports 24 and 26.

The numeral 36 denotes a permanent magnet; and, as shown particularly by FIG. 5, that magnet is generally U-shaped in plan. The pole pieces of that magnet are spaced a short distance away from the bosses 34 on the outer face of the support 26, as that magnet and support are viewed in FIG. 1. An L-shaped yoke 38 of magnetic material has the long arm thereof disposed within the notches 28 and 30, respectively, in the left-hand sides of the supports 24 and 26, as those supports are viewed in FIG. 3. The rearmost portion of the long arm of that L-shaped yoke abuts one of the pole faces of the permanent magnet 36; and it is held in engagement with that pole face by the magnetic lines of flux provided by that magnet. The short arm of the L-shaped yoke 38 overlies the left-hand portion of the outer face of the support 24, as that support is viewed in FIG. 3. A rivet 40, of magnetic material, is permanently secured to the free end of the short arm of the L-shaped yoke 38; and the shank of that rivet extends into the recess 31 defined by the two left-hand bosses 32 on the outer face of the support 24, as shown particularly by FIG. 2. A similar L-shaped yoke 42 has the long arm thereof disposed within the notches 28 and 30, respectively, in the right-hand sides of the supports 24 and 26, as those supports are viewed in FIG. 3. The rearmost portion of the long arm of the L-shaped yoke 42 abuts the other pole face of the permanent magnet 36; and it is held in engagement with that pole face by the magnetic lines of flux developed by that magnet. The short arm of the L-shaped yoke 42 overlies the right-hand portion of the outer face of the support 24, as that support is viewed in FIG. 3. A rivet 44, of magnetic material, is permanently secured to the free end of the short arm of the L-shaped yoke 42; and the shank of that rivet extends into the recess 33 defined by the two right-hand bosses 32 on the outer face of the support 24. An adjusting screw 46 is rotatably disposed within a threaded opening in the long arm of the L-shaped yoke 38, and that adjusting screw is in register with the support 24. An adjusting screw 48 is disposed within a threaded opening in the long arm of the L-shaped yoke 42, and that adjusting screw also is in register with the support 24.

The numeral 50 denotes a generally rectangular plate of insulation which has six small passages through it and which has a large opening 52 in it. The six small passages are grouped so that three of them are adjacent the front end of the plate 50, and so the other three passages are about half-way between the front and rear ends of that plate, as shown particularly by FIG. 1. The large opening 52 is disposed intermediate the two groups of three passages. The plate 50 abuts the upper faces of the supports 24 and 26; and the front edge of that plate is generally in register with the front face of the support 24. The rear edge of the plate 50 extends rearwardly of the support 26 and also extends rearwardly of the magnet 36. A similar plate 54 of insulation has three passages adjacent the front thereof, and has three passages about half-way between the front and rear ends of that plate. The plate 54 also has a large opening 56 therein; and that large passage is intermediate the two groups of three passages. The plate 54 abuts the bottom faces of the supports 24 and 26; and the front and rear edges of that plate are in register with the front and rear edges of the plate 50. The openings 52 and 56 in the plates 50 and 54 are useful as inspection and assembly openings. The small passages in the plates 50 and 54 accommodate the terminals of the windings in the permeability probe 20.

The numeral 58 denotes a small cable clamp which is secured to the upper surface of the plate 54 by a nut and bolt combination 60; and that cable clamp supports one end of a flexible electrical cable 61 which includes the leads for the various windings in the permeability probe 20. That cable clamp is located rearwardly of the magnet 36. A potentiometer 62 is mounted on the under surface of the plate 50, and that potentiometer is disposed rearwardly of the magnet 36. An adjusting screw for that potentiometer extends rearwardly beyond the rear edge of the plate 50. A resistor 64 is located atop the upper surface of the plate 50 to the left of the opening 52, as that opening is viewed in FIG. 7. A resistor 66 is located atop the upper surface of the plate 50 to the right of the opening 52, as that opening is viewed in FIG. 7.

A shallow channel 68 of magnetic material is dimensioned to telescope over the left-hand sides of the plates 50 and 54. That channel has a short slot 70 extending inwardly from the leading edge thereof; and that slot is in register with the adjusting screw 46 carried by the L-shaped yoke 38. A similar shallow channel 72 is dimensioned to telescope over the right-hand sides of the plates 50 and 54. A short slot 74 extends rearwardly from the leading edge of the channel 72; and that slot is in register with the adjusting screw 48 carried by the L-shaped yoke 42. The slots 70 and 74 are dimensioned to permit an Allen wrench to be telescoped through them to rotate the adjusting screws 46 and 48.

A fastener 76, shown in the form of a length of adhesive-bearing tape, is wound around the long arms of the L-shaped yokes 38 and 42; and that fastener helps hold those yokes in assembled relation with the supports 24 and 26. If desired, two or more fasteners 76 could be provided to hold the yokes 38 and 42 in assembled relation with the supports 24 and 26. A fastener 78, in the form of a length of adhesive-bearing tape, is wound around the shallow channels 68 and 72 adjacent the front ends of those channels; and that fastener helps hold those channels in assembled relation with the plates 50 and 54. The fastener 78 is disposed far enough rearwardly of the front ends of the shallow channels 68 and 72 to leave the slots 70 and 74 in those channels exposed. A further fastener 77, in the form of an elongated adhesive-bearing tape, is wound around the channels 76 and 78 adjacent the rear ends of those channels; and that fastener helps hold the channels in engagement with the plates 50 and 54. The fasteners 76, 77 and 78 are used to hold the various component parts of the permeability probe 20 in properly assembled relation prior to and during the time that the permeability probe is encapsulated within a body 79 of insulating material. Thereafter, that body of insulating material will hold the various component parts of that permeability probe in properly assembled relation. The body 79 of insulating material will be formed so the outer faces of the rivets 40 and 44 are exposed, and so the adjusting shaft of the potentiometer 62 is exposed. As a result, the outer faces of the rivets 40 and 44 can be readily placed directly in engagement with materials and objects to be tested; and the position of the movable contact of the potentiometer 62 can be readily adjusted.

Referring particularly to FIG. 9, the numeral 90 denotes a power supply which can be identical to the similarly numbered power supply in Norman Wolff and Niels C. Andersen patent application Ser. No. 343,632 for Control Systems, which was filed Feb. 10, 1964, now Patent No. 3,389,333. The power supply 90 has output terminals 84, 86 and 88, and also has output terminals 205, 207 and 209. The terminal 86 is grounded, and terminal 84 is positive relative to ground while terminal 88 is negative relative to ground. The terminal 209 is grounded, and terminal 205 is positive relative to ground while terminal 207 is negative relative to ground. A double pole, single throw switch 92 can be closed to connect the power supply 90 to a suitable source of power. A conductor 80 extends between the terminal 84 of the power supply 90 and an amplifier 210 which can be identical to the similarly numbered amplifier in the said Wolff et al. application. A conductor 82 extends between the terminal 88 of the power supply 90 and a frequency doubler 131 which can be identical to the similarly numbered frequency doubler in the said Wolff et al. application; and the conductor 82 also extends between the terminal 88 and the amplifier 210.

As shown by FIG. 10, a junction 94 is provided in the amplifier 210; and that junction connects the right-hand terminal of a resistor 96 to the conductor 80. A conductor 98 extends from the left-hand terminal of the resistor 96 to a terminal 314 on the permeability probe 20, as indicated by FIGS. 7 and 8. The resistor 64 is connected between the terminal 314 and a terminal 344 on the permeability probe 20. A junction 100 in FIGS. 9 and 10 connects the upper terminals of potentiometers 102 and 140 to the junction 94. A resistor 124 connects the movable contact of the potentiometer 102 to the movable contact of a potentiometer 123 which is connected as an adjustable resistor. The left-hand terminal of the potentiometer 123 is connected to the terminal 360 on the permeability probe 20 by a switch 367, a conductor 362, and a junction 365. The lower terminal of the potentiometer 102 is connected to the lower terminal of the potentiometer 140 by a junction 109; and both of those lower terminals are connected to the conductor 82 by a junction 110. As a result, both of the potentiometers 102 and 140 are connected in parallel across the conductors 80 and 82. A resistor 146 is connected to the left-hand terminal of the capacitor 113 in FIG. 10 by a junction 142; and that junction is connected to the terminal 360 of the permeability probe 20 by a conductor 363, the junction 365, and the conductor 362. The base of the transistor 104 of the amplifier 210 is connected to a terminal 366 of the permeability probe 20 by a conductor 364, and that conductor is grounded.

The amplifier 210 and the similarly numbered amplifier in the said Wolff et al. application have similarly numbered components; and the structure and function of those components are the same. Similarly, the power amplifier 266 and the similarly numbered power amplifier of the said Wolff et al. application have many similarly numbered components; and the structure and function of those components are the same.

A three pole, single throw switch 154 can be closed to connect the frequency doubler 131 to a suitable source of three-phase alternating current. In the preferred embodiment of the present invention, that source provides three-phase four hundred cycle per second alternating current. Conductors 132 and 134 extend from the frequency doubler 131 to two of the terminals of the ring 130 of the ring demodulator in the amplifier 210, as shown particularly by FIG. 10. Conductors 368 and 370 extend from the frequency doubler 131 to terminals 320 and 323 of the permeability probe 20.

A conductor 206 extends between the power supply output terminals 205 and the upper terminals of resistors 236 and 238 and the anode of diode 256 in the power amplifier 266. A conductor 208 extends between the power supply output terminal 207 and the lower terminals of resistors 246 and 248 and the emitter of transistor 228 of that power amplifier. A conductor 232 extends between the collector of transistor 162 of amplifier 210 and the left-hand terminal of resistor 234 of power amplifier 266; and a resistor 216 is connected between a junction 230 in that conductor and the conductor 80.

A conductor 252 extends between junction 250 of the power amplifier 266 and a junction 270. A terminal 272 is connected to the junction 270; and that terminal and a grounded terminal 273 can, if desired, be connected to a suitable recording device. A movable contact 276 and a movable contact 296 are connected to the junction 270; and those movable contacts are "ganged" to move in unison. Stationary contacts 278, 280 and 282 are disposed adjacent the movable contact 276, and those contacts can be selectively engaged by that movable contact. Stationary contacts 298, 300, and 302 are disposed adjacent the movable contact 296, and those contacts can be engaged by that movable contact. A jumper connects the stationary contacts 278 and 280; and another jumper interconnects the stationary contacts 298 and 302. An adjustable resistor 284 and a resistor 286 are connected in series between a junction 288 and the stationary contacts 278 and 280. An adjustable resistor 292 and a resistor 294 are connected in series between the junction 288 and the stationary contact 282. A conductor 290 connects the junction 288 with the terminal 322 on the permeability probe 20. A resistor 304 is connected between a junction 306 and the stationary contacts 298 and 302, and a resistor 312 is connected between the junction 306 and the stationary contact 300. An adjustable resistor 308 connects the junction 306 to one terminal of a meter 310; and the other terminal of that meter is grounded.

Referring particularly to FIG. 8, the numeral 334 and the numeral 336 denote windings that are wound on the magnetic core 21 of the coil form 22 of the permeability probe 20. The numerals 338 and 340 denote windings that are wound on the magnetic core 23 of that coil form. The numeral 342 denotes a winding that is wound on both of the magnetic cores 21 and 23. The lower terminals of the windings 334 and 338 are connected together; and the upper terminal of the winding 334 is connected to the terminal 360, while the upper terminal of the winding 338 is connected to the terminal 366. The lower terminals of the windings 336 and 340 are connected together; and the upper terminal of the winding 336 is connected to a terminal 344 on the permeability probe 20, while the upper terminal of the winding 340 is connected to a terminal 352 on that permeability probe. A conductor 358 extends between and connects the terminals 352 and 360; and a conductor 354 extends between the terminal 352 and one terminal of the potentiometer 62. A conductor 350 extends between the movable contact of the potentiometer 62 and a terminal 348 on the permeability probe 20; and a conductor 346 extends between the other terminal of the potentiometer 62 and the terminal 344.

The permanent magnet 36 of the permeability probe 20 establishes a magnetic field in the magnetic cores 21 and 23, in the yokes 38 and 42, and in the air within and adjacent that permeability probe. That magnetic field causes magnetic flux lines to flow in one direction through the magnetic core 21 and through the yoke 38, while causing magnetic flux lines to flow in the opposite direction through the magnetic core 23 and through the yoke 42. The free ends of the L-shaped yokes 38 and 42 are spaced apart, and the resulting air gap constitutes a substantial reluctance in the path for the magnetic flux lines flowing through those L-shaped yokes.

The windings 334 and 338 are connected in series between the terminals 360 and 366, and are thus connected between the capacitor 113 and the base of transistor 104. Also, the series-connected windings 334 and 338 are connectable by the switch 367 between potentiometer 123 and the grounded conductor 364. The windings 334 and 338 are wound so direct current flowing from terminal 360 via windings 334 and winding 338 to terminal 366 will develop magnetic flux lines in the magnetic core 21 which will buck the magnetic flux lines developed in that magnetic core by the permanent magnet 36, and will develop magnetic flux lines in the magnetic core 23 which will buck the magnetic flux lines developed in that magnetic core by the permanent magnet 36. Consequently, when the switch 367 is closed, biasing current will flow from output terminal 84 of power supply 90 via conductor 80, potentiometer 102, resistor 124, potentiometer 123, switch 367, the series-connected windings 334 and 338, and conductor 364 to ground; and that biasing current will develop a magnetic field in the magnetic cores 21 and 23 which will buck the magnetic field developed in those magnetic cores by the permanent magnet 36.

The windings 336, 340, 334 and 338 are connected in series between terminals 344 and 366, and are thus connected between the conductor 80 and the grounded conductor 364. As a result, further biasing current will flow from the output terminal 84 of power supply 90 via conductor 80, junction 94, resistor 96, conductor 98, terminal 314, resistor 64, terminal 344, windings 336 and 340, terminal 352, conductor 358, terminal 360, windings 334 and 338, terminal 366, and conductor 364 to ground. That flow of further biasing current will develop a magnetic field in the magnetic cores 21 and 23 which will buck the magnetic field developed in those magnetic cores by the permanent magnet 36.

The series-connected windings 334 and 338 also are connected between the conductor 290 and the grounded conductor 364. Whenever the transistor 226 in FIG. 10 is conductive, current will flow from output terminal 205 of power supply 90 via conductor 206, diode 256, transistor 226, junction 250, conductor 252, junction 270, contacts 276 and 278, adjustable resistor 284, resistor 286, conductor 290, terminal 322, resistor 66, terminal 348, conductor 350, the movable contact and upper section of potentiometer 62, conductor 354, terminal 352, conductor 358, junction 360, the windings 334 and 338, terminal 366 and conductor 364 to ground. That flow of current will develop a magnetic field in the magnetic cores 21 and 23 which will buck the magnetic field developed in those magnetic cores by the permanent magnet 36.

As shown by FIG. 8, the potentiometer 62 is connected across the serially connected windings 340 and 336; and the movable contact of that potentiometer is connected to the terminal 348 by the conductor 350. Hence, current can flow from the terminal 348 to terminal 366 either through conductor 350, the lower section of potentiometer 62, the serially connected windings 336 and 340, and the serially connected windings 334 and 338 or through the conductor 350, the upper section of potentiometer 62, and the windings 334 and 338. Adjustment of the position of the movable contact of that potentiometer will determine how much of the current will flow through the serially connected windings 336, 340, 334 and 338 and how much of the current will flow through the serially connected windings 334 and 338.

The direct connection between the upper terminal of winding 338 and the base of transistor 104, and the connection of the upper terminal of winding 334 to the emitter of that transistor by the capacitor 113 enable the alternating current developed in those windings to vary the conductivity of that transistor. As a result, those windings serve as the output windings of the permeability probe 20.

The windings 334 and 338 of the permeability probe 20 are so connected that they enable that permeability probe to act as a gradiometer probe, insofar as the earth's magnetic field is concerned. This is very desirable; because it enables the permeability-sensing control system provided by the present invention to provide a test of permeability which is substantially independent of the earth's magnetic field.

The conductor 98 is encased within a flexible electrical shield, the conductors 362 and 364 are encased within a second flexible electrical shield, the conductor 290 is encased within a third flexible electrical shield, and the conductors 368 and 370 are encased within a fourth flexible electrical shield. Those flexible electrical shields are connected together and to a grounded conductor 372. Consequently, the effect which external electrical interference could have upon the conductors 98, 290, 362, 364, 368 and 370, and thus upon the operation of the permeability probe 20, is minimized.

The meter 310 is a galvanometer which has three scales; and each of those scales is calibrated to provide a direct reading of permeability. One of those scales is rendered effective when the movable contacts 276 and 296 of FIGS. 9 and 10 are set in their uppermost positions; and that scale is calibrated to provide direct readings of permeability from one to five. Another of those scales is rendered effective when the movable contacts 276 and 296 of FIGS. 9 and 10 are set in their middle positions; and that scale is calibrated to provide direct readings of permeability from one to three. The third of those scales is rendered effective when the movable contacts 276 and 296 of FIGS. 9 and 10 are set in their lowermost positions; and that scale is calibrated to provide direct readings of permeability from one to two. The three scales are calibrated as one to five, one to three, and one to two, respectively, rather than as zero to four, zero to two, and zero to one, because the permeability of air is one; and it is the permeabilities of the various materials and objects relative to that of air which is to be measured. Each scale is divided into twenty divisions; and on the one to five scale each of the divisions represents two-tenths, on the one to three scale each of the divisions represents one-tenth, and on the one to two scale each of the divisions represents five-hundredths.

*Calibration of permeability probe*

To calibrate the permeability probe 20 of the present invention before it is encapsulated, the following steps should be taken:

A. The movable contacts 276 and 296 of FIGS. 9 and 10 should be set in their uppermost positions, the movable contact of potentiometer 62 should be set close to its middle position, the switch 367 should be opened, and the switches 92 and 154 should be closed. The setting of the movable contacts 276 and 296 in their uppermost positions will make the one to five permeability scale of the meter 310 effective; and the opening of the switch 367 will enable the mechanical adjustments of the permeability probe 20 to be made without being affected by the settings of the potentiometers 123 and 102. The closing of the switches 92 and 154 will supply power to the power supply 90 and to the frequency doubler 131; and that power supply and that frequency doubler will then supply power to the permeability probe 20, the amplifier 210, and the power amplifier 266. The permanent magnet 36 will develop a magnetic field in the magnetic cores 21 and 23; but the current flowing from output terminal 84 of power supply 90 via conductor 80, resistor 96, conductor 98, resistor 64, windings 336 ad 340, conductor 358. windings 334 and 338, and conductor 364 to ground will develop a magnetic field that will buck the magnet's magnetic field.

B. An unmagnetized piece of soft iron should be placed in engagement with the outer faces of the rivets 40 and 44 of FIG. 1; and that piece of soft iron will sharply reduce the reluctance of the magnetic path constituted by the L-shaped yokes 38 and 42. That magnetic path is in parallel with the magnetic path constituted by the magnetic cores 21 and 23, and is in parallel with many other magnetic paths through the air within and adjacent to the permeability probe 20; and the sharp reduction in the reluctance of the magnetic path constituted by the L-shaped yokes 38 and 42 will materially increase the flux density in that magnetic path and in all of the other magnetic paths in the permeability probe 20. The material increase in the flux density in the magnetic path constituted by the magnetic cores 21 and 23 will enable the magnet-induced magnetic field in those magnetic cores to materially exceed the current-induced magnetic field in those magnetic cores. As a result, the needle of the meter 310 will move "off scale" beyond the numeral five if all connections have been made properly.

C. The unmagnetized piece of soft iron should then be moved away from the outer faces of the rivets 40 and 44, and the reading on the meter 310 should be noted. The placing of the unmagnetized piece of soft iron in engagement with the outer faces of the rivets 40 and 44 tends to enable the magnet 36 to magnetize the L-shaped yokes 38 and 42 of the permeability probe 20; and hence tends to stabilize the readings on the meter 310.

D. Steps B and C should be repeated until the positions of the needle of meter 310, caused by two successive placings of the unmagnetized piece of soft iron in engagement with the outer faces of the rivets 40 and 44, differ by less than one division on the one to five permeability scale.

E. An allen wrench should then be used to adjust the positions of the adjusting screws 46 and 48. Each adjusting screw should be adjusted the same amount—to keep the air gap between the short arms of the L-shaped yokes 38 and 42 centered relative to the magnetic cores 21 and 23 of the coil form 22—until the needle of the meter 310 substantially indicates a permeability of one. Increasing the size of the air gap causes the needle of the meter 310 to indicate an increase in permeability, and decreasing the size of that air gap causes that needle to indicate a decrease in permeability.

F. Steps B through E should be repeated until the meter 310 substantially indicates a permeability of one each time after the unmagnetized piece of soft iron has been placed in engagement with the outer faces of the rivets 40 and 44 and has then been moved away from those outer faces.

G. The movable contacts 276 and 296 of FIGS. 9 and 10 should be set in their middle positions to make the one to threree permeability scale effective. Thereupon, a test sample having a known permeability should be set in engagement with the outer faces of the rivets 40 and 44; and the movable contact of the potentiometer 62 in FIG. 8 should be adjusted to change the gain of the control system sufficiently to cause the meter 310 to indicate a permeability which is very close to that of the test sample. For example when, in one preferred embodiment of the present invention, a test sample having a permeability of about one and ninety-eight hundredths was set in engagement with the outer faces of the rivets 40 and 44 and the movable contact of the potentiometer 62 was adjusted to indicate a permeability between one and ninety-six hundredths and two on the meter 310, the gain of the control system was adequately adjusted.

If the reading on the meter 310 is appreciably greater than the permeability of the test sample, the gain of the permeability probe can be reduced by placing one or more pieces of magnetic material across the pole faces of the magnet 36, to shunt some of the magnetic flux lines developed by that magnet. One such piece of metal is indicated in FIG. 5 by the numeral 37. On the other hand, if the reading on the meter 310 is appreciably smaller than the permeability of that test sample, the gain of the permeability probe can be increased by using one or more pieces of magnetic material to "bridge" the minute air gaps between the rear ends of the L-shaped yokes 38 and 42 and the pole faces of the magnet 36. Two "bridging" pieces of magnetic material are indicated in FIG. 5 by the numeral 39. The pieces 37 and 39 can be made from different magnetic materials; but the metals from which the laminations for transformers are made have been found to be very suitable. The pieces 37 and 39 of magnetic material are very desirable; because they enable permeability probes 20 to be made with magnets 36 that vary appreciably in strength.

H. The test sample should be moved away from the outer faces of the rivets 40 and 44, and the reading on the meter 310 should be noted. If that reading is not within two divisions, on the one to three scale, on either side of "one," steps B through G should be repeated.

I. If the reading on the meter 310 is exactly one, whenever the unmagnetized piece of soft iron is spaced away from the outer faces of the rivets 40 and 44, the switch 367 in FIG. 9 can be left open. However, if that reading is not exactly one, when the unmagnetized piece of soft iron is spaced away from the outer faces of the rivets 40 and 44, and if a very accurate determination of permeability is desired, the switch 367 should be closed and the movable contacts of the potentiometers 102 and 123 should be adjusted to make the reading on the meter 310 exactly one. The closing of the switch 367 will cause current to flow from output terminal 84 of power supply 90 via conductor 80, junctions 94 and 100, the upper section and movable contact of potentiometer 102, resistor 124, the movable contact and left-hand section of potentiometer 123, switch 367, conductor 362, windings 334 and 338, and conductor 364 to ground; and that flow of current will develop an additional bucking magnetic field within the magnetic cores 21 and 23. If the movable contact of the potentiometer 102 is set close to the lower end of that potentiometer, current can flow from ground via the conductor 364, windings 338 and 334, conductor 362, switch 367, the left-hand section and movable contact of potentiometer 123, resistor 124, the movable contact and lower section of potentiometer 102. junctions 109 and 110, and conductor 82 to the output terminal 88 of the power supply 90; and that flow of current will develop an aiding magnetic field within the magnetic cores 21 and 23. An adjustment of the movable contact of potentiometer 102 will provide a "coarse" adjustment of the position of the needle of meter 310, and an adjustment of the movable contact of potentiometer 123 will provide a "fine" adjustment of the position of that needle.

The movable contacts 276 and 296 should then be set in their lowermost positions; and test samples having known permeabilities between one and two should be placed in engagement with the outer faces of the rivets 40 and 44. The readings on the meter 310 should closely match the values of those test samples.

J. The movable contacts 276 and 296 should be set in their middle positions; and test samples having known permeabilities between one and three should be placed in engagement with the outer faces of the rivets 40 and 44. The readings on the meter 310 should closely match the values of those test samples.

K. The movable contacts 276 and 296 should be set in their uppermost positions; and test samples having known permeabilities between one and five should be placed in engagement with the outer faces of the rivets 40 and 44. The readings on the meter 310 should closely match the values of those test samples.

If the meter readings obtained in steps I, J or K differ excessively from the values of the test samples, steps B through K should be repeated. However, if the meter readings obtained in steps I, J or K closely match the values of the test samples, the permeability probe 20 should be encapsulated.

After that permeability probe has been encapsulated, calibrating steps B through D should be repeated. Thereafter, if the switch 367 had not been closed in a calibrating procedure, that switch should be closed; and the movable contacts of the potentiometers 102 and 123 should be adjusted to make the reading on the meter exactly one, whenever the outer faces of the rivets 40 and 44 are spaced away from all nearby materials and objects. Thereupon, calibration steps G through K, excluding the addition of magnetic shunts or bridges, should be repeated.

Operation of permeability-sensing control system

In the said preferred embodiment of the present invention, the power supply 90 develops a positive voltage of substantially twenty-four volts at the terminal 205, develops a negative voltage of substantially twenty-four volts at the terminal 207, develops a regulated positive voltage of twenty-four volts at the terminal 84, and develops a regulated negative voltage of twenty-four volts at the terminal 88. The frequency doubler 131 is a magnetic frequency doubler; and the bias windings of that frequency doubler are connected to the negative terminal 88 of the power supply 90 by conductor 82 and to ground, as disclosed by the said Wolff et al. application. The conductors 368 and 370 connect the secondary winding of a transformed within the frequency doubler 131 to the winding 342 in the permeability probe 20.

Whenever the switch 154 is closed, the frequency doubler 131 will supply eight hundred cycles per second to the ring 130 of the ring demodulator in the amplifier 210; and will supply four hundred cycles per second to the winding 342 in the permeability probe 20. The power supplied to the winding 342 will recurrently saturate the magnetic cores 21 and 23 in the coil form 22, and can develop a second harmonic of eight hundred cycles per second. That second harmonic will be sensed by the windings 334 and 338; and the capacitor 113 will couple that second harmonic to the base-emitter circuit of the transistor 104.

The capacitor 108 and the primary winding of the transformer 106 in the amplifier 210 coact to constitute a parallel-resonant circuit; and that circuit is tuned to resonate at eight hundred cycles per second. Similarly, capacitor 122 and the primary winding of transformer 120 in that amplifier coact to constitute a parallel-resonant circuit; and that circuit also is tuned to resonate at eight hundred cycles per second. This means that those resonant circuits will resonate whenever the windings 334 and 338 of the permeability probe 20 sense any second harmonic and couple it to the base-emitter circuit of transistor 104.

The winding 342 is wound on the magnetic cores 21 and 23 of the coil form 22 in such a way that the magnetic flux lines developed by that winding will, at any instant, tend to provide the same polarity in each of those magnetic cores. Because that winding is energized by four hundred cycle alternating current, the polarities of the magnetic cores 21 and 23 will tend to change several hundreds of time every second; but that winding will always tend to make the polarities of both magnetic cores the same. The magnet 36, on the other hand, provides magnetic flux lines that always tend to make the polarity of the magnetic core 21 opposite to that of the magnetic core 23. As a result, during each positive-going half-cycle of the four hundred cycle alternating current supplied to the winding 342, the magnetic flux lines developed by that winding will aid the magnet-induced flux lines in magnetic core 21 but will buck the magnet-induced flux lines in magnetic core 23. Consequently, during the positive-going half-cycles of the four hundred cycle alternating current supplied to the winding 342, the magnetic core 21 will become saturated before the magnetic core 23 can become saturated, unless the current-induced magnetic field in the magnetic cores 21 and 23 balances the magnet-induced magnetic field in those magnetic cores. During each negative-going half-cycle of the four hundred cycle alternating current supplied to the winding 342, the magnetic flux lines developed by that winding will buck the magnet-induced flux lines in magnetic core 21 but will aid the magnet-induced flux lines in magnetic core 23. Consequently, during the negative-going half-cycles of the four hundred cycle alternating current supplied to the winding 342, the magnetic core 23 will become saturated before the magnetic core 21 can become saturated, unless the current-induced magnetic field in the magnetic cores balances the magnet-induced magnetic field in those magnetic cores. Whenever either of the magnetic cores 21 and 23 becomes saturated before the other—and this happens whenever the current-induced magnetic field in those magnetic cores fails to balance the magnet-induced magnetic field in those magnetic cores—a second harmonic of the four hundred cycle alternating current supplied to winding 342 is developed in the windings 334 and 338 and is applied to the transistor 104.

The alternating magnetic flux lines developed in the magnetic cores 21 and 23 by the winding 342 develop alternating currents in the series-connected windings 334 and 338; and those alternating currents recurrently make the emitter of transistor 104 more negative and less negative relative to the base of that transistor; and hence will recurrently increase and decrease the conductivity of that transistor. The resulting variations in the current flowing through the primary winding of transformer 106 will induce corresponding variations in the voltage across the secondary winding of that transformer. Those voltage variations will recurrently make the base of transistor 112 more positive and less positive relative to the emitter of that transistor; and hence will recurrently increase and decrease the conductivity of that transistor. The resulting variations in the current flowing through the primary winding of transformer 120 will induce an A.C. signal in the secondary winding of that transformer. If the current-induced magnetic field in the magnetic cores 21 and 23 balances the magnet-induced magnetic field in those magnetic cores, substantially no second harmonic will be supplied to the transistor 104; and, because the inputs of the transformers 106 and 120 are tuned to that second harmonic, substantially no signal will be supplied to the ring 130 of the ring demodulator of the amplifier 210. However, if the current-induced magnetic field in the magnetic cores 21 and 23 does not balance the magnet-induced magnetic field in those magnetic cores, an amplified second harmonic signal will be supplied to the ring 130 of the ring demodulator of the amplifier 210.

That amplified second harmonic signal will make the voltage at the center tap of the secondary winding of transformer 120 in FIG. 10, and hence at the base of transistor 156, negative relative to ground; and such a voltage will cause the conductivity of transistor 156 to increase, thereby causing the voltage at the base of transistor 158 to decrease, and also causing the voltage at the collector of transistor 156 to increase. The decreased voltage at the base of transistor 158 will make that transistor less conductive; and the resulting decrease in the current flowing through resistor 178 will increase the voltage at the collector of that transistor. The increase in voltage at the collector of transistor 158 will be applied to the base of transistor 160 by resistor 188, and the increase in voltage at the collector of transistor of 156 will be coupled to the base of transistor 160 by capacitor 194 and resistor 188, and hence the transistor 160 will become less conductive. The resulting decrease in the current flowing through resistor 182 will cause the voltage at the base of transistor 162 to become more negative; and, thereupon, that transistor will become less conductive.

The resulting decreased voltage drop across resistor 216 will increase the voltage at the base of transistor 220, thereby making that transistor more conductive. More current will then flow through resistor 238, and hence the base of transistor 222 will become less positive, and that transistor will become more conductive. The resulting increase in voltage drop across resistor 246 will make the bases of transistors 224 and 226 positive relative to ground. Transistor 224 will be nonconductive, but transistor 226 will become conductive. Because transistor 224 is nonconductive, the transistor 228 also will be nonconductive. Thereupon, current will flow from output terminal 205 of power supply 90 via conductor 206, diode 256, the collector-emitter circuit of transistor 226, junction 250, conductor 252, junction 270, contacts 276 and 278, adjustable resistor 284, resistor 286, junction 288, conductor 290, terminal 322, resistor 66, terminal 348, conductor 350, either through the movable contact and lower section of potentiometer 62 and conductor 346 and terminal 344 and windings 336 and 340 to the terminal 352 or through that movable contact and the upper section of that potentiometer and conductor 354 to that terminal and thence via conductor 358, terminal 360, windings 334 and 338, terminal 336, and conductor 364 to ground. That flow of current will increase the bucking magnetic field within the magnetic cores 21 and 23 until that magnetic field balances the magnet-induced magnetic field.

Whenever the outer faces of the rivets 40 and 44 are spaced away from nearby materials and objects, the current which flows from conductor 98 via resistor 64 and windings 336, 340, 334 and 338 to the grounded conductor 364 should coact with the current flowing from conductor 362 via windings 334 and 338 to that grounded conductor to develop a bucking magnetic field that nicely balances the magnet-induced magnetic field in the magnetic cores 21 and 23. Where that is the case, there is substantially no flow of feedback current through transistor 226, adjustable resistor 284, resistor 286, conductor 290, and the windings 336, 340, 334 and 338 to the base of transistor 104; and the voltage at junction 270 is close to ground. Consequently, substantially no current flows through the meter 310, and the needle of that meter indicates a permeability of "one."

When the outer faces of the rivets 40 and 44 are placed in engagement with a material or objects of unknown permeability, that material or object will sharply reduce the reluctance of the magnetic path which includes the L-shaped yokes 38 and 42. Thereupon, the flux density in that magnetic path, and in all of the other magnetic paths in the permeability probe 20, will materially increase; and the resulting increase in the magnet-induced magnetic field in the magnetic cores 21 and 23 will, instantaneously, exceed the current-induced magnetic field in those magnetic cores. Consequently, for a few positive-going half-cycles of the alternating current supplied to the winding 342 in the permeability probe 20, one of the magnetic cores 21 and 23 will saturate before the other; and, for a few negative-going half-cycles of the alternating current supplied to that winding, the other of those magnetic cores will saturate before the said one magnetic core saturates. The resulting second harmonic signal that will be developed in the windings 334 and 338 will be applied to the base-emitter circuit of transistor 104. The tuned inputs of the transformers 106 and 120 will amplify that signal and apply it to the ring 130 of the ring demodulator of amplifier 210; and that ring demodulator will cause transistor 226 of power amplifier 266 to become conductive. Thereupon, enough feedback current will automatically flow through transistor 226, contacts 276 and 278, adjustable resistor 284, resistor 286, resistor 66, potentiometer 62, windings 336, 340, 334 and 338, and conductor 364 to ground to rebalance the magnetic fields within the magnetic cores 21 and 23. The increased conductivity of the transistor 226 will make the voltage at the junctions 250 and 270 in FIG. 10 positive relative to ground; and the meter 310 will respond to the resulting flow of current therethrough to indicate the permeability of the material or object abutting the rivets 40 and 44.

The magnetic fields within the magnetic cores 21 and 23 will remain balanced at the higher flux density established by the feedback currents as long as the outer surfaces of the rivets 40 and 44 are held against the material or object; and hence the meter 310 will continue to indicate the permeability of that material or object. However, as soon as the outer faces of the rivets 40 and 44 are moved away from that material or object, the magnet-induced magnetic field in the magnetic cores 21 and 23 will decrease sharply; and, thereupon, the windings 334 and 338 will sense a second harmonic signal which will be applied to transistor 104, amplified by amplifier 210, further amplified by power amplifier 266, and used to reduce the conductivity of transistor 226. The voltage at junctions 250 and 270 will fall until it is close to ground; and hence the meter 310 will again indicate a permeability of "one."

The greater the permeability of the material or object against which the outer faces of the rivets 40 and 44 are placed, the greater the reduction in the reluctance of the magnetic path which includes the magnetic cores 21 and 23—and hence the greater the greater the instantaneous unbalance between the magnet-induced and current-induced magnetic fields within those magnetic cores. The greater unbalance between those magnetic fields requires greater conductivity of transistor 226 to provide the needed feedback current, and that greater condctivity further increases the voltage at the junctions 250 and 270. The meter 310 will respond to the increased voltage at those junctions to provide a greater deflection of the needle thereof. In this way, the permeability sensing control system of the present invention causes the needle of the meter 310 to deflect in proportion to the permeability of the material or object against which the outer faces of the rivets 40 and 44 are pressed.

Where the materials and objects of unknown permeability are sizable, the readings of the meter 310 are within a few percentage points of the permeabilities of those materials and objects. However, where the objects that are to be measured are quite small—less than one-half of an inch in diameter and less than five-eighths of an inch thick—a correction factor is needed for the meter readings. Such a correction factor has been prepared in the form of a chart; and that chart is readily usable to correct readings obtained on small objects.

*Conclusion*

The L-shaped yokes 38 and 42 provide a magnetic path which has an air gap that is readily "bridged" by a material or object of unknown permeability. The rivets 40 and 44 on the short arms of those yokes are desirable in defining the air gap in that magnetic path. However, those rivets are not essential; and hence they can be deleted.

The permeability probe 20 is sturdy and rugged; and it can be freely handled without any distortion of the readings of the meter 310. However, that permeability probe can be adversely affected by a strong magnetic field; and hence, that permeability probe should be kept away from a strong magnet.

When the movable contacts 276 and 296 of FIG. 10 are shifted from their uppermost positions to their middle positions, the value of the resistance in the feedback circuit is not changed but the value of the resistance in the circuit of meter 310 is effectively cut in half. When the movable contacts 276 and 296 of FIG. 10 are shifted from their uppermost positions to their lowermost positions, the value of the resistance in the feedback is changed but the value of the resistance in the circuit of meter 310 is left unchanged. In this simple and direct way, the desired ranges for the meter 310 are obtained.

The adjustable resistors 284, 292 and 308 do not need to be adjusted during the calibration or operation of the permeability probe 20. Those adjustable resistors will be suitably adjusted when the permeability-sensing control system is built; and no further adjustment will be needed.

The amplifier 210 and the power amplifier 266 of the said Wolff et al. application have been used in describing the calibration and operation of the permeability probe of the present invention. Actually, because that permeability probe does not require even a small fraction of the power required by the Helmholtz coils of that application, the amplifier that is used with that permeability probe is smaller and less powerful than either amplifier 210 or power amplifier 266.

What we claim is:

1. A permeability-sensing control system which comprises a U-shaped permanent magnet, an elongated L-shaped yoke of magnetic material connected to each pole of the magnet and arranged so that the pair of yokes and magnet form a generally rectangular configuration with the bases of the L-shaped yokes being spaced from one another to form an air gap in the small side of the rectangle opposite the magnet, rivets of magnetic material secured to the end of the base of each yoke and projecting outwardly from the rectangle, adjusting screws carried by said L-shaped yokes adjacent the bases permitting adjustment of the width of the air gap between said bases, a pair of elongated readily saturable magnetic cores arranged within the rectangular configuration parallel to one another and to the elongated sides of the L-shaped yokes and being magnetically coupled with the magnet, a shim of magnetic material positioned between the arms of said magnet acting as a magnetic shunt, said L-shaped yokes and said magnetic cores forming parallel paths for the magnetic flux lines from the magnet, an excitation winding wound upon said magnetic cores, a source of alternating current connected to said energizing winding, an output winding wound upon said magnetic cores in such a manner that an output signal will be developed therein whose amplitude is proportional to the strength of the magnetic flux through said magnetic cores due to said magnet, a feedback winding wound on said magnetic cores in such a manner that a direct current flowing therethrough would cause a magnetic field in said magnetic cores in a direction opposite to that caused by the magnet, circuit means connected between said output winding and said feedback winding, said circuit means converting said output signal into a direct current proportional to said output signal which current flows through said feedback winding thereby causing a magnetic field in said magnetic cores opposing the magnetic field due to the magnet, meter means connected in said circuit means indicating the strength of the feedback signal and therefore the strength of the magnetic flux flowing through the magnetic cores due to the magnet, said U-shaped permanent magnet, said magnetic cores, said excitation winding, said feedback winding, said output winding, said L-shaped yokes, said adjusting screws, said rivets and said shim being assembled together and constituting a hand-held probe with a flexible cable connecting said windings with said circuit means whereby when an object whose permeability is to be measured is contacted by the rivets secured to the bases of said yokes the reluctance of the air gap between said yokes is sharply reduced thereby increasing the magnetic flux lines from the magnet in the magnetic path constituted by the L-shaped yokes and thereby also changing the flux lines of the magnet through the parallel magnetic path comprising the magnetic cores, the latter change being indicated by said meter as a measure of the permeability of the object, said output winding being wound so said probe is a gradiometer with regard to the earth's magnetic field, whereby said probe is substantially insensitive to the earth's magnetic field.

2. A permeability-sensing control system which comprises a permanent magnet, an elongated L-shaped yoke of magnetic material adjacent each pole of the magnet and arranged so that the pair of yokes and magnet form a generally rectangular configuration with the bases of the L-shaped yokes being spaced from one another to form an air gap in the small side of the rectangle opposite the magnet, rivets of magnetic material secured to the end of the base of each yoke and projecting outwardly from the rectangle, a pair of elongated readily saturable magnetic cores arranged within the rectangular configuration parallel to one another and to the elongated sides of the L-shaped yokes and being magnetically coupled with the magnet, said L-shaped yokes and said magnetic cores forming parallel paths for the magnetic flux lines from the magnet, an excitation winding wound upon said magnetic cores, a source of alternating current connected to said energizing winding, an output winding wound upon said magnetic cores in such a manner that an output signal will be developed therein whose amplitude is proportional to the strength of the magnetic flux through said magnetic cores due to said magnet, a feedback winding wound on said magnetic cores in such a manner that a direct current flowing therethrough would cause a magnetic field in said magnetic cores in a direction opposite to that caused by the magnet, circuit means connected to said output winding and said feedback winding, said circuit means responding to said output signal to cause current to flow through said feedback winding thereby causing a magnetic field in said magnetic cores opposing the magnetic field due to the magnet, meter means connected in said circuit means indicating the strength of the feedback signal and therefore the strength of the magnetic flux flowing through the magnetic cores due to the magnet, said permanent magnet, said magnetic cores, said excitation winding, said feedback winding, said output winding, said L-shaped yokes, and said rivets being assembled together and constituting a hand-held probe with a flexible cable connecting said windings with said circuit means whereby when an object whose permeability is to be measured is contacted by the rivets secured to the bases of said yokes the reluctance of the air gap between said yokes is sharply reduced thereby increasing the magnetic flux lines from the magnet in the magnetic path constituted by the L-shaped yokes and thereby also changing the flux lines of the magnet through the parallel magnetic path comprising the magnetic cores, the latter change being indicated by said meter as a measure of the permeability of the object, said output winding being wound so said probe is a gradiometer with regard to the earth's magnetic field, whereby said probe is substantially insensitive to the earth's magnetic field.

3. A permeability-sensing control system which comprises a permanent magnet, a yoke of magnetic material adjacent each pole of the magnet and arranged so that the pair of yokes and magnet form a generally closed loop with said yokes spaced apart to form an air gap spaced from the magnet, a pair of magnetic cores arranged within said generally closed loop parallel to each other and closely adjacent and at least in part coextensive with said yokes and being magnetically coupled with the magnet, said yokes and said magnetic cores forming parallel paths for the magnetic flux lines from the magnet, an excitation winding wound upon said magnetic cores, a source of alternating current connected to said energizing winding, an output winding wound upon said magnetic cores in such a manner that an output signal will be developed therein whose amplitude is proportional to the strength of the magnetic flux through said magnetic cores due to said magnet, a feedback winding wound on said magnetic cores in such a manner that a direct current flowing therethrough would cause a magnetic field in said magnetic cores in a direction opposite to that caused by the magnet, circuit means connected to said output winding and said feedback winding, said circuit means responding to said output signal to cause current to flow through said feedback winding thereby causing a magnetic field in said magnetic cores opposing the magnetic field due to the magnet, meter means connected in said circuit means indicating the strength of the feedback signal and therefore the strength of the magnetic flux flowing through the magnetic cores due to the magnet, said permanent magnet, said magnetic cores, said excitation winding, said feedback winding, said output winding and said yokes being assembled together and constituting a hand-held probe with a flexible cable connecting said windings with said circuit means whereby when an object whose permeability is to be measured is contacted by the gap-forming portions of said yokes the reluctance of the air gap between said yokes is sharply reduced thereby increasing the magnetic flux lines from the magnet in the magnetic path constituted by the yokes and thereby also changing the flux lines of the magnet through the parallel magnetic path comprising the magnetic cores, the latter change being indicated by said meter as a measure of the permeability of the object, said output winding being wound so said probe is a gradiometer with regard to the earth's magnetic field, whereby said probe is substantially insensitive to the earth's magnetic field.

4. A permeability-sensing control system which comprises a magnet, a yoke of magnetic material adjacent each pole of the magnet and arranged so that the pair of yokes and magnet form a generally closed loop with said yokes spaced apart to form an air gap spaced from the magnet, a pair of magnetic cores arranged within said generally closed loop parallel to each other and closely adjacent and at least in part coextensive with said yokes and being magnetically coupled with the magnet, said yokes and said magnetic cores forming parallel paths for the magnetic flux lines from the magnet, an excitation winding wound upon said magnetic cores, an output winding wound upon said magnetic cores in such a manner that an output signal will be developed therein whose amplitude is proportional to the strength of the magnetic flux through said magnetic cores due to said magnet, a feedback winding wound on said magnetic cores in such a manner that a direct current flowing therethrough would cause a magnetic field in said magnetic cores in a direction opposite to that caused by the magnet, circuit means connected to said output winding and said feedback winding, said circuit means responding to said output signal to cause current to flow through said feedback winding thereby causing a magnetic field in said magnetic cores opposing the magnetic field due to the magnet, meter means connected in said circuit means indicating the strength of the feedback signal and therefore the strength of the magnetic flux flowing through the magnetic cores due to the magnet, said magnet, said magnetic cores, said excitation winding, said feedback winding, said output winding, and said yokes being assembled together and constituting a hand-held probe with a flexible cable connecting said windings with said circuit means whereby when an object whose permeability is to be measured is contacted by the gap-forming portions of said yokes the reluctance of the air gap between said yokes is sharply reduced thereby increasing the magnetic flux lines from the magnet in the magnetic path constituted by the yokes and thereby also changing the flux lines of the magnet through the parallel magnetic path comprising the magnetic cores, the latter change being indicated by said meter as a measure of the permeability of the object.

5. A permeability-sensing control system which comprises a magnet, a yoke of magnetic material adjacent each pole of the magnet and arranged so that the pair of yokes and magnet form a generally closed loop with portions of said yokes spaced apart from each other to form an air gap, a pair of magnetic cores arranged within said generally closed loop parallel to each other and closely adjacent and at least in part coextensive with said yokes and being magnetically coupled with the magnet, said yokes and said magnetic cores forming parallel paths for the magnetic flux lines from the magnet, an output winding wound upon said magnetic cores in such a manner that an output signal will be developed therein whose amplitude is proportional to the strength of the magnetic flux through said magnetic cores due to said magnet, a feedback winding wound on said magnetic cores in such a manner that a direct current flowing therethrough would cause a magnetic field in said magnetic cores in a direction opposite to that caused by the magnet, circuit means connected to said output winding and said feedback winding, said circuit means responding to said output signal to cause current to flow through said feedback winding thereby causing a magnetic field in said magnetic cores opposing the magnetic field due to the magnet, meter means connected in said circuit means indicating the strength of the feedback signal and therefore the strength of the magnetic flux flowing through the magnetic cores due to the magnet, said magnet, said magnetic cores, said feedback winding, said output winding and said yokes being assembled together and constituting a hand-held probe with a flexible cable connecting said windings with said circuit means whereby when an object whose permeability is to be measured is contacted by said gap-forming portions of said yokes the reluctance of the air gap between said yokes is sharply reduced thereby increasing the magnetic flux lines from the magnet in the magnetic path constituted by the yokes and thereby also changing the flux lines of the magnet through the parallel magnetic path comprising the magnetic cores, the latter change being indicated by said meter as a measure of the permeability of the object, said magnetic cores and said winding being part of a magnetometer which is bodily incorporated in said probe.

6. A permeability-sensing control system which comprises a magnet, a yoke of magnetic material adjacent each pole of the magnet and arranged so that the pair of yokes and magnet form a generally closed loop with portions of said yokes spaced apart from each other to form an air gap, a magnetic core arranged within said generally closed loop closely adjacent and at least in part coextensive with said yokes and being magnetically coupled with the magnet, said yokes and said magnetic core forming parallel paths for the magnetic flux lines from the magnet, an output winding wound upon said magnetic core which develops an output signal proportional to the strength of the magnetic flux in said magnetic core due to said magnet, a feedback winding wound on said magnetic core in such a manner that a direct current flowing therethrough would cause a magnetic field in said magnetic core in a direction opposite to that caused by the magnet, circuit means connected to said output winding and said feedback winding, said circuit means responding to said output signal to cause current to flow through said feedback winding thereby causing a magnetic field in said magnetic core opposing the magnetic field due to the magnet, meter means connected in said circuit means indicating the strength of the magnetic flux flowing through the magnetic core due to the magnet, said magnet, said magnetic core, said output winding, said feedback winding and said yokes being assembled together and constituting a hand-held probe with a flexible cable connecting said windings with said circuit means whereby when an object whose permeability is to be measured is contacted by said gap-forming portions of said yokes the reluctance of the air gap between said yokes is sharply reduced thereby increasing the magnetic flux lines from the magnet in the magnetic path constituted by the yokes and thereby also changing the flux lines of the magnet through the parallel magnetic path comprising the magnetic core, the latter change being indicated by said meter as a measure of the permeability of the object, said magnetic core and said winding being part of a magnetometer which is bodily incorporated in said probe.

7. A permeability-sensing control system which comprises:
(a) a probe which includes a magnet, a magnetometer with windings therein, and a path of magnetic material for magnetic flux lines which is physically separated from and is in addition to said magnetometer,
(b) said magnetometer and said path of magnetic material for magnetic flux lines being disposed in substantial shunting relation with each other, said magnetometer and said path of magnetic material being disposed within the magnetic field of said magnet whereby magnetic flux lines from said magnet will flow through said magnetometer and said path of magnetic material, and said path of magnetic material having a substantial portion of the length thereof coextensive with a substantial portion of the length of said magnetometer and being close enough to each other to enable a change in the reluctance of said path of magnetic material to change the density of the magnet-induced flux lines in said magnetometer, (c) said path of magnetic material for magnetic flux lines having an air gap therein, and (d) a circuit that includes said windings of said magnetometer and that responds to the density of the magnet-induced flux lines in said magnetometer to indicate a value of permeability, (e) the portions of said path of magnetic material for magnetic flux lines which define said air gap being disposable adjacent materials or objects to change the reluctance of said air gap and thereby change the density of the magnet-induced flux lines in said magnetometer to enable said circuit to indicate a value of permeability, (f) said path of magnetic material for magnetic flux lines including spaced-apart yokes of magnetic material physically different from and in addition to said magnet, (g) each of said yokes having one end thereof close to said magnet and having the other end thereof adjacent said air gap, (h) said yokes being disposed outwardly of said magnetometer.

8. A permeability-sensing control system which comprises:

(a) a probe which includes a magnet, a magnetometer with windings therein, and a path of magnetic material for magnetic flux lines which is physically separated from and is in addition to said magnetometer, (b) said magnetometer and said path of magnetic material for magnetic flux lines being disposed in substantial shunting relation with each other, said magnetometer and said path of magnetic material being disposed within the magnetic field of said magnet whereby magnetic flux lines from said magnet will flow through said magnetometer and said path of magnetic material, and said path of magnetic material having a substantial portion of the length thereof coextensive with a substantial portion of the length of said magnetometer and being close enough to each other to enable a change in the reluctance of said path of magnetic material to change the density of the magnet-induced flux lines in said magnetometer, (c) said path of magnetic material for magnetic flux lines having an air gap therein, and (d) a circuit that includes said windings of said magnetometer and that responds to the density of the magnet-induced flux lines in said magnetometer to indicate a value of permeability, (e) the portions of said path of magnetic material for magnetic flux lines which define said air gap being disposable adjacent materials or objects to change the reluctance of said air gap and thereby change the density of the magnet-induced flux lines in said magnetometer to enable said circuit to indicate a value of permeability, (f) said path of magnetic material for magnetic flux lines including spaced apart, L-shaped yokes of magnetic material physically different from and in addition to said magnet, (g) said magnetometer including a plurality of magnetic cores which are parallel to each other and to the legs of said L-shaped yokes, (h) said magnetic cores and said windings of said magnetometer being located between said legs of said L-shaped yokes.

9. A permeability-sensing control system which comprises:

(a) a probe which includes a magnet, a magnetometer with windings therein, and a path of magnetic material for magnetic flux lines which is physically separated from and is in addition to said magnetometer, (b) said magnetometer and said path of magnetic material for magnetic flux lines being disposed in substantial shunting relation with each other, said magnetometer and said path of magnetic material being disposed within the magnetic field of said magnet whereby magnetic flux lines from said magnet flow will through said magnetometer and said path of magnetic material, and said path of magnetic material having a substantial portion of the length thereof coextensive with a substantial portion of the length of said magnetometer and being close enough to each other to enable a change in the reluctance of said path of magnetic material to change the density of the magnet-induced flux lines in said magnetometer, (c) said path of magnetic material for magnetic flux lines having an air gap therein, and (d) a circuit that includes said windings of said magnetometer and that responds to the density of the magnet-induced flux lines in said magnetometer to indicate a value of permeability, (e) the portions of said path of magnetic material for magnetic flux lines which define said air gap being disposable adjacent materials or objects to change the reluctance of said air gap and thereby change the density of the magnet-induced flux lines in said magnetometer to enable said circuit to indicate a value of permeability, (f) said path of magnetic material for magnetic flux lines including spaced apart L-shaped yokes of magnetic material which are in addition to said magnet, (g) said magnetometer including a plurality of magnetic cores, (h) said magnetic cores having said windings of said magnetometer wound thereon, (i) the legs of said L-shaped yokes being spaced apart so said magnetic cores and said windings of said magnetometer are intermediate said L-shaped yokes and are at least in part shielded from external magnetic fields by said L-shaped yokes.

10. A permeability-sensing control system which comprises:

(a) a probe which includes a magnet, a magnetometer with windings therein, and a path of magnetic material for magnetic flux lines which is physically separated from and is in addition to said magnetometer, (b) said magnetometer and said path of magnetic material for magnetic flux lines being disposed in substantial shunting relation with each other, said magnetometer and said path of magnetic material being disposed within the magnetic field of said magnet whereby magnetic flux lines from said magnet will flow through said magnetometer and said path of magnetic material, and said path of magnetic material having a substantial portion of the length thereof coextensive with a substantial portion of the length of said magnetometer and being close enough to each other to enable a change in the reluctance of said path of magnetic material to change the density of the magnet-induced flux lines in said magnetometer, (c) said path of magnetic material for magnetic flux lines having an air gap therein, and (d) a circuit that includes said windings of said magnetometer and that responds to the density of the magnet-induced flux lines in said magnetometer to indicate a value of permeability, (e) the portions of said path of magnetic material for magnetic flux lines which define said air gap being disposable adjacent materials or objects to change the reluctance of said air gap and thereby change the density of the magnet-induced flux lines in said magnetometer to enable said circuit to indicate a value of permeability, (f) said magnetometer having magnetic cores with said windings thereon, (g) one of said windings being an output winding wound upon said magnetic cores in such a manner that an output signal will be developed therein whose amplitude is proportional to the strength of the magnetic flux through said magnetic cores due to said magnet.

11. A permeability-sensing control system which comprises:

(a) a probe which includes a magnet, a magnetometer with windings therein, and a path of magnetic material for magnetic flux lines which is physically separated from and is in addition to said magnetometer, (b) said magnetometer and said path of magnetic material for magnetic flux lines being disposed in substantial shunting relation with each other, said magnetometer and said path of magnetic material being disposed within the magnetic field of said magnet whereby magnetic flux lines from said magnet will flow through said magnetometer and said path of magnetic material, and said path of magnetic material having a substantial portion of the length thereof coextensive with a substantial portion of the length of said magnetometer and being close enough to each other to enable a change in the reluctance of said path of magnetic material to change the density of the magnet-induced flux lines in said magnetometer, (c) said path of magnetic material for magnetic flux lines having an air gap therein, and (d) a circuit that includes said windings of said magnetometer and that responds to the density of the magnet-induced flux lines in said magnetometer to indicate a value of permeability, (e) the portions of said path of magnetic material for magnetic flux lines which define said air gap being disposable adjacent materials or objects to change the reluctance of said air gap and thereby change the density of the magnet-induced flux lines in said magnetometer to enable said circuit to indicate a value of permeability, (f) said path of magnetic material for magnetic flux lines including yokes of magnetic material which are in addition to said magnet, (g) said magnetometer having magnetic cores with said windings thereon, (h) said windings being connected so said probe is a gradiometer with regard to the earth's magnetic field, whereby said probe is substantially insensitive to the earth's magnetic field, (i) said probe being hand-held and being connected to said circuit by an elongated flexible cable so it can be moved in different directions and attitudes to measure the permeability of objects.

12. A permeability-sensing control system which comprises:

(a) a probe which includes a magnet, a magnetometer with windings therein, and a path of magnetic material for magnetic flux lines which is physically separated from and is in addition to said magnetometer, (b) said magnetometer and said path of magnetic material for magnetic flux lines being disposed in substantial shunting relation with each other, said magnetometer and said path of magnetic material being disposed within the magnetic field of said magnet whereby magnetic flux lines from said magnet will flow through said magnetometer and said path of magnetic material, and said path of magnetic material having a substantial portion of the length thereof coextensive with a substantial portion of the length of said magnetometer and being close enough to each other to enable a change in the reluctance of said path of magnetic material to change the density of the magnet-induced flux lines in said magnetometer, (c) said path of magnetic material for magnetic flux lines having an air gap therein, (d) a circuit that includes said windings of said magnetometer and that responds to the density of the magnet-induced flux lines in said magnetometer to indicate a value of permeability.

(e) the portions of said path of magnetic material for magnetic flux lines which define said air gap being disposable adjacent materials or objects to change the reluctance of said air gap and thereby change the density of the magnet-induced flux lines in said magnetometer to enable said circuit to indicate a value of permeability, (f) said probe being small enough to be readily held in a user's hand, and (g) an elongated flexible cable connected to, and extending between, said probe and said circuit which permits said probe to engage materials and objects spaced away from said circuit, (h) one of said windings being a feedback winding wound on the magnetic material of said magnetometer in such a manner that a direct current flowing therethrough would cause a magnetic field in said magnetic material in a direction opposite to that caused by the magnet, (i) said circuit varying the amount of current in said feedback winding as the reluctance of said path of magnetic material is varied by placing objects of different permeabilities in bridging relation with said air gap.

13. A permeability-sensing control system which comprises:

(a) a probe which includes a magnet, a magnetometer with windings therein, and a path of magnetic material for magnetic flux lines which is physically separated from and is in addition to said magnetometer, (b) said magnetometer and said path of magnetic material for magnetic flux lines being disposed in substantial shunting relation with each other, said magnetometer and said path of magnetic material being disposed within the magnetic field of said magnet whereby magnetic flux lines from said magnet will flow through said magnetometer and said path of magnetic material, and said path of magnetic material having a substantial portion of the length thereof coextensive with a substantial portion of the length of said magnetometer and being close enough to each other to enable a change in the reluctance of said path of magnetic material to change the density of the magnet-induced flux lines in said magnetometer, (c) said path of magnetic material for magnetic flux lines having an air gap therein, (d) a circuit that includes said windings of said magnetometer and that responds to the density of the magnet-induced flux lines in said magnetometer to indicate a value of permeability, (e) the portions of said path of magnetic material for magnetic flux lines which define said air gap being disposable adjacent materials or objects to change the reluctance of said air gap and thereby change the density of the magnet-induced flux lines in said magnetometer to enable said circuit to indicate a value of permeability, (f) said magnet being a permanent magnet, and (g) an elongated, flexible cable connected to, and extending between, said probe and said circuit which permits said probe to engage materials and objects spaced away from said circuit.

14. A permeability-sensing control system which comprises:

(a) a probe which includes a magnet, a magnetometer with windings therein, and a path of magnetic material for magnetic flux lines which is physically separated from and is in addition to said magnetometer, (b) said magnetometer and said path of magnetic material for magnetic flux lines being disposed in substantial shunting relation with each other, said magnetometer and said path of magnetic material being disposed within the magnetic field of said magnet whereby magnetic flux lines from said magnet will flow through said magnetometer and said path of magnetic material, and said path of magnetic material having a substantial portion of the length thereof coextensive with a substantial portion of the length of said magnetometer and being close enough to each other to enable a change in the reluctance of said path of magnetic material to change the density of the magnet-induced flux lines in said magnetometer, (c) said path of magnetic material for magnetic flux lines having an air gap therein, and (d) a circuit that includes said windings of said magnetometer and that responds to the density of the magnet-induced flux lines in said magnetometer to indicate a value of permeability, (e) the portions of said path of magnetic material for magnetic flux lines which define said air gap being disposable adjacent materials or objects to change the reluctance of said air gap and thereby change the density of the magnet-induced flux lines in said magnetometer to enable said circuit to indicate a value of permeability, (f) said path of magnetic material for magnetic flux lines including spaced-apart yokes of magnetic material which are in addition to said magnet, (g) said magnetometer having the windings thereof connected so said probe is a gradiometer with regard to the earth's magnetic field, whereby said probe is substantially insensitive to the earth's magnetic field.

15. A permeability-sensing control system which comprises:

(a) a probe which includes a magnet, a magnetometer with windings therein, and a path of magnetic material for magnetic flux lines which is physically separated from and is in addition to said magnetometer, (b) said magnetomer and said path of magnetic material for magnetic flux lines being disposed in substantial shunting relation with each other, said magnetometer and said path of magnetic material being disposed within the magnetic field of said magnet whereby magnetic flux lines from said magnet will flow through said magnetometer and said path of magnetic material, and said path of magnetic material having a substantial portion of the length thereof coextensive with a substantial portion of the length of said magnetometer and being close enough to each other to enable a change in the reluctance of said path of magnetic material to change the density of the magnet-induced flux lines in said magnetometer, (c) said path of magnetic material for magnetic flux lines having an air gap therein, and (d) a circuit that includes said windings of said magnetometer and that responds to the density of the magnet-induced flux lines in said magnetometer to indicate a value of permeability, (e) the portions of said path of magnetic material for magnetic flux lines which define said air gap being disposable adjacent materials or objects to change the reluctance of said air gap and thereby change the density of the magnet-induced flux lines in said magnetometer to enable said circuit to indicate a value of permeability.

16. A probe for a permeability-sensing control system which comprises:

(a) a magnet, (b) a plurality of paths for magnetic flux lines which are in addition to said magnet, (c) said paths for magnetic flux lines being disposed within the magnetic field of said magnet and being at least in part coextensive and being close enough to each other to enable a change in the reluctance of one of said paths to change the density of the magnet-induced flux lines in another of said paths, (d) said one path for magnetic flux lines being of magnetic material and having an air gap therein, and (e) means adjacent said other path for magnetic flux lines to respond to the density of the magnet-induced flux lines in said other path for magnetic flux lines to provide a signal proportional to the permeability of objects or materials adjacent said air gap, said other path for magnetic flux lines being the magnetic material of a magnetometer which has a plurality of windings therein, said means including one of said windings in said magnetometer, said magnet and said plurality of paths for magnetic flux lines and said means being assembled together to form a hand-held probe that can be set in different positions and attitudes, (f) the portions of said one path for magnetic flux lines, which define said air gap being disposable adjacent materials or objects to change the reluctance of said air gap and thereby change the density of the magnet-induced flux lines in said other path for magnetic flux lines, (g) said one path for magnetic flux lines including spaced apart yokes of magnetic material, (h) said other path for magnetic flux lines including the magnetic cores of said magnetometer, (i) said paths for magnetic flux lines being in parallel, (j) said windings of said magnetometer being connected so said probe is a gradiometer with regard to the earth's magnetic field, whereby said probe is substantially insensitive to the earth's magnetic field.

17. A probe for a permeability-sensing control system which comprises:

(a) a magnet, (b) a plurality of paths for magnetic flux lines which are in addition to said magnet, (c) said paths for magnetic flux lines being disposed within the magnetic field of said magnet and being at least in part coextensive and being close enough to each other to enable a change in the reluctance of one of said paths to change the density of the magnet-induced flux lines in another of said paths, (d) said one path for magnetic flux lines being of magnetic material and having an air gap therein, and (e) means adjacent said other path for magnetic flux lines to respond to the density of the magnet-induced flux lines in said other path for magnetic flux lines to provide a signal proportional to the permeability of objects or materials adjacent said air gap, said other path for magnetic flux lines being the magnetic material of a magnetometer which has a plurality of windings therein, said means including one of said windings in said magnetometer, said magnet and said plurality of paths for magnetic flux lines and said means being assembled together to form a hand-held probe that can be set in different positions and attitudes, (f) the portions of said one path for magnetic flux lines, which define said air gap being disposable adjacent materials or objects to change the reluctance of said air gap and thereby change the density of the magnet-induced flux lines in said other path for magnetic flux lines, (g) said magnet being a permanent magnet, (h) said one path for magnetic flux lines including spaced-apart yokes of magnetic material and said other path for magnetic flux lines including the magnetic cores of said magnetometer, (i) one of said windings of said magnetometer being wound so an output signal will be developed therein proportional to the strength of the magnetic flux through said magnetic cores due to said magnet, (j) another of said windings of said magnetometer being wound in such a manner that a direct current flowing therethrough would cause a magnetic field in said magnetic cores in a direction opposite to that caused by the magnet.

18. A probe for a permeability-sensing control system which comprises:

(a) a magnet, (b) a plurality of paths for magnetic flux lines which are in addition to said magnet, (c) said paths for magnetic flux lines being disposed within the magnetic field of said magnet and being at least in part coextensive and being close enough to each other to enable a change in the reluctance of one of said paths to change the density of the magnet-induced flux lines in another of said paths, (d) said one path for magnetic flux lines being of magnetic material and having an air gap therein, and (e) means adjacent said other path for magnetic flux lines to respond to the density of the magnet-induced flux lines in said other path for magnetic flux lines to provide a signal proportional to the permeability of objects or materials adjacent said air gap, said other path for magnetic flux lines being the magnetic material of a magnetometer which has a plurality of windings therein, said means including one of said windings in said magnetometer, said magnet and said plurality of paths for magnetic flux lines and said means being assembled together to form a hand-held probe that can be set in different positions and attitudes, (f) the portions of said one path for magnetic flux lines, which define said air gap being disposable adjacent materials or objects to change the reluctance of said air gap and thereby change the density of the magnet-induced flux lines in said other path for magnetic flux lines.

References Cited

UNITED STATES PATENTS

| | | | |
|---|---|---|---|
| 2,067,804 | 1/1937 | Thorne | 324—37 |
| 2,469,476 | 5/1949 | Sellars | 324—34 |
| 2,609,420 | 9/1952 | Watson et al. | 324—34 |
| 2,752,564 | 6/1956 | Ryerson | 324—43 |
| 2,903,645 | 9/1959 | Wright et al. | 324—34 |

FOREIGN PATENTS

| | | |
|---|---|---|
| 45,373 | 2/1962 | Poland. |
| 378,983 | 8/1932 | Great Britain. |

RUDOLPH V. ROLINEC, *Primary Examiner.*

R. J. CORCORAN, *Assistant Examiner.*